United States Patent
Belloni (10) Patent No.: US 10,422,998 B1
(45) Date of Patent: Sep. 24, 2019

(54) LASER TRANSFORMER LENS

(71) Applicant: Mark Belloni, Brewster, OH (US)

(72) Inventor: Mark Belloni, Brewster, OH (US)

( * ) Notice: Subject to any disclaimer, the term of this patent is extended or adjusted under 35 U.S.C. 154(b) by 594 days.

(21) Appl. No.: 14/869,931

(22) Filed: Sep. 29, 2015

Related U.S. Application Data (63) Continuation-in-part of application No. 14/545,665, filed on Jun. 3, 2015, now abandoned.

(51) Int. Cl.
| | |
|---|---|
| G02B 27/00 | (2006.01) |
| G02B 27/09 | (2006.01) |
| G02B 5/32 | (2006.01) |
| G02B 1/10 | (2015.01) |
| G01B 11/14 | (2006.01) |
| G01S 7/481 | (2006.01) |

(52) U.S. Cl.
CPC .......... G02B 27/0927 (2013.01); G01B 11/14 (2013.01); G01S 7/4811 (2013.01); G02B 1/10 (2013.01); G02B 5/32 (2013.01); G02B 27/0955 (2013.01)

(58) Field of Classification Search
CPC . G02B 27/09; G02B 27/0938; G02B 27/0955
USPC .................. 250/216, 221; 356/124
See application file for complete search history.

(56) References Cited

U.S. PATENT DOCUMENTS

| | | |
|---|---|---|
| 4,170,417 A * | 10/1979 | Tourres .................. G01B 11/02 250/223 B |
| RE32,988 E | 7/1989 | Smid |
| 5,225,928 A | 7/1993 | Dugan |
| 5,613,769 A | 3/1997 | Parkyn, Jr. et al. |
| 5,655,832 A | 8/1997 | Pelka et al. |
| 5,676,453 A | 10/1997 | Parkyn, Jr. et al. |
| 5,806,955 A | 9/1998 | Parkyn, Jr. et al. |
| 6,160,934 A | 12/2000 | Beach et al. |
| 6,336,738 B1 | 1/2002 | Feuermann et al. |
| 6,347,109 B1 | 2/2002 | Beach et al. |
| 6,377,403 B1 | 4/2002 | Smith |
| 6,634,753 B1 | 10/2003 | Rozenman |
| 6,643,311 B2 | 11/2003 | Krupke |
| 6,936,855 B1 | 8/2005 | Harrah |
| 7,061,958 B2 | 6/2006 | Krupke |
| 7,061,960 B2 | 6/2006 | Krupke |
| 7,140,763 B1 | 11/2006 | Keith-Wolfe |
| 7,213,940 B1 | 5/2007 | Van De Ven et al. |
| 7,546,010 B2 | 6/2009 | Fujii et al. |

(Continued)

*Primary Examiner* — Kevin K Pyo
(74) *Attorney, Agent, or Firm* — Pearne & Gordon LLP (57) ABSTRACT

The laser transformer lens is a hollow shaped translucent lens that transforms a laser beam into a laser sheet substantially which is capable of spanning a planar space nearly. In the event that the optical characteristics of the laser beam and the laser transformer lens are designed properly, a laser sheet of controlled form may be developed as the laser light enters, traverses, and exits the lens. The projection of the transmitted laser sheet, as it impinges on an opaque surface remote from the laser transformer lens results in a laser curve along the surface area which the laser sheet strikes. Moreover, hybrid designs of the laser transformer lens may tune substantially the waveform characteristics such as: wave speed, phase velocity, group velocity, reflection, transmission, refraction, amplitude modulation, frequency modulation, attenuation, fan angle, and wave width.

23 Claims, 10 Drawing Sheets

(56) References Cited

U.S. PATENT DOCUMENTS

| | | |
|---|---|---|
| 7,577,492 B2 | 8/2009 | Kamiya et al. |
| 7,614,759 B2 | 11/2009 | Negley |
| 7,642,521 B2 | 1/2010 | Willi et al. |
| 7,722,220 B2 | 5/2010 | Van De Ven |
| 7,744,243 B2 | 6/2010 | Van De Ven et al. |
| 7,768,192 B2 | 8/2010 | Van De Ven et al. |
| 7,796,173 B2 | 9/2010 | Lettvin |
| 7,841,741 B2 | 11/2010 | Chan et al. |
| 7,898,749 B2 | 3/2011 | Ford et al. |
| 7,901,107 B2 | 3/2011 | Van De Ven et al. |
| 7,969,549 B2 | 6/2011 | Boom et al. |
| 8,038,317 B2 | 10/2011 | Van De Ven et al. |
| 8,079,729 B2 | 12/2011 | Van De Ven et al. |
| 8,097,926 B2 | 1/2012 | De Graff et al. |
| 8,112,921 B2 | 2/2012 | Van De Ven et al. |
| 8,120,128 B2 | 2/2012 | Matsumoto |
| 8,217,897 B2 | 4/2012 | Lutian |
| 8,174,205 B2 | 5/2012 | Myers et al. |
| 8,237,912 B2 | 8/2012 | Boom et al. |
| 8,276,819 B2 | 10/2012 | Canini et al. |
| 8,310,143 B2 | 11/2012 | Van De Ven et al. |
| 8,328,376 B2 | 12/2012 | Negley |
| 8,335,420 B2 | 12/2012 | Beach et al. |
| 8,337,071 B2 | 12/2012 | Negley et al. |
| 8,357,553 B2 | 1/2013 | Veerasamy et al. |
| 8,372,726 B2 | 2/2013 | De Graff et al. |
| 8,403,531 B2 | 3/2013 | Negley et al. |
| 8,441,206 B2 | 5/2013 | Myers et al. |
| 8,492,788 B2 | 7/2013 | Veerasamy et al. |
| 8,536,667 B2 | 9/2013 | De Graff et al. |
| 8,573,804 B2 | 11/2013 | Veerasamy et al. |
| 8,596,819 B2 | 12/2013 | Negley et al. |
| 8,628,214 B2 | 1/2014 | Negley et al. |
| 8,759,855 B2 | 6/2014 | Kamada |
| 8,854,737 B2 | 10/2014 | Nagano et al. |
| 8,858,004 B2 | 10/2014 | Negley |
| 8,878,429 B2 | 11/2014 | Van De Ven et al. |
| 8,889,251 B2 | 11/2014 | Soules et al. |
| 8,917,315 B2 | 12/2014 | Negishi |
| 8,981,677 B2 | 3/2015 | Myers et al. |
| 9,036,251 B2 | 5/2015 | Nowak et al. |
| 9,042,422 B2 | 5/2015 | Muro et al. |
| 9,494,533 B2 * | 11/2016 | Orlov .................... G01N 21/87 |
| 10,184,218 B1 | 1/2019 | Belloni et al. |

\* cited by examiner

LASER TRANSFORMER LENS

CROSS REFERENCE FOR RELATED APPLICATIONS

Not Applicable

STATEMENT REGARDING FEDERALLY SPONSORED RESEARCH AND DEVELOPMENT

Not Applicable

BACKGROUND OF THE INVENTION

Under some circumstances, a need exists to excite a substantially planar laser sheet by means of passing a laser beam source through a lens. The phrase laser sheet is assumed to be used interchangeably with the phrases: planar wave, laser plane, electromagnetic wave, electro-optic wave and planar optic wave as referenced by those of ordinary skill in the art.

Numerous patents exist which utilize hollow lens shapes related to the general functioning of lasers devices and laser systems; however, none directly are used to form a substantially planar wave form that is transmitted from the usage of a hollow lens. The following patents were found to use a hollow lens in one fashion or another as stated after the name of the inventor in parentheses—

U.S. Pat. No. 8,854,737 (Nagano) uses a collimator devise upstream of focusing polychromatic light with a wide spectrum width; but does not refer to the capability of laser light spanning a planar space greater than 90 degrees.

U.S. Pat. No. 9,042,422 (Muro) uses a rotational resonator laser along with a collimator lens; however, it does not refer to the capability of the collimated laser light spanning a space that is greater than 90 degrees.

U.S. Pat. No. 9,036,251 (Nowak) talks about slab amplification devices used in slab waveguides while referring to beam profile; but does not talk about laser light collimated such that it spans a space greater than 180 degrees.

U.S. Pat. No. 8,217,897 (Lutian) uses collimated laser light for optical tracking; but does not talk about the spatial capability of the collimated light.

U.S. Pat. No. RE32,988 (Smid) uses the term collimated lens relating to producing a collimated radiation beam but does not make reference to the resulting spatial character of the laser light.

U.S. Pat. No. 5,225,928 (Dugan) has a focus compensating lens that collimates laser light in such a way that it is capable of temperature compensating.

U.S. Pat. No. 8,328,376 (Negley) talks about a lighting device where the surface area of projection is twice as large as the surface area of a projection of the light emitter.

U.S. Pat. No. 8,917,315 (Negishi) uses a hollow lens holder for imaging applications of endoscopes.

U.S. Pat. No. 6,160,934 (Beach) describes a hollow lens duct for purposes of reflective waveguiding.

U.S. Pat. No. 7,722,220 (Van De Ven) refers to representative examples of reflective elements of hollow shapes such as: cylinders, conical, frusto-conical, semi-elliptical, or any shape which includes one or more portions of the above shapes. These lens shapes in combination with thermal conduction elements, and solid state light emitters (LEDs) along with other embodiments are used for a lighting device—or—recess light can.

U.S. Pat. No. 7,546,010 (Fujii) refers to using a hollow lens so as to cross a propagating direction of light for use in an optical waveguide.

U.S. Pat. No. 6,336,738 (Feurermann, et al.) refers to a hollow lens-mirror that is replaced by a solid dielectric concentrator for their system, and method, that concentrates emitted light intensity to nearly restore the power density of an active radiating region of the source at the target.

U.S. Pat. No. 5,806,955 (Parkyn, Jr., et al.) describes an example of using a light source within the confines of a hollow lens in a floodlight application for their radiant energy redirecting system.

U.S. Pat. No. 5,676,453 (Parkyn, Jr., et al.) describes a light source that is within the confines of a hollow lens, as in a floodlight application, for their radiant energy redirecting system.

U.S. Pat. No. 5,655,832 (Pelka, et al.) describes a light source that is within the confines of a hollow lens, as in a floodlight application, for their radiant energy redirecting system.

U.S. Pat. No. 5,613,769 (Parkyn, Jr., et al.) describes a light source that is within the confines of a hollow lens, as in a floodlight application, for their lens apparatus that includes a TIR lens having multiple facets.

U.S. Pat. No. 7,577,492 (Parkyn, Jr. et al.) describes a light source that is within the confines of the hollow lens, as in a floodlight application.

U.S. Pat. No. 8,981,677 (Myers) refers to the usage of a hollow lens that is attached to a base as a conventional light fixture for the lighting devises and methods for lighting.

U.S. Pat. No. 6,160,934 (Beach, et al.) describes a hollow lensing duct to condense light using a combination of focusing via a spherical or cylindrical lens followed by reflective waveguiding. The intensifying light that the hollow duct generates can be applied to the coupling of diode array pump light to solid state lasing materials.

U.S. Pat. No. 8,917,315 (Negishi) uses a hollow lens holder that is open on both ends for an imaging module design.

U.S. Pat. No. 6,347,109 (Beach, et al.) has multiple references to a hollow lensing duct and a hollow optics element that comprises a lens duct used in the design of their high average power scalable thin-disk laser.

U.S. Pat. No. 8,889,251 (Soules, et al.) makes use of a hollow lens duct for the methods of production of alkali resistant optical coatings for alkali lasers.

U.S. Pat. No. 6,377,403 (Smith) leverages the use of a hollow lens array to construct a short pulse laser protection fly's eye.

U.S. Pat. No. 8,878,429 (Van De Ven, et al.) uses an example of conventional light fixtures which include a hollow lens and attached base plate for making their lighting device and lighting method.

U.S. Pat. No. 8,858,004 (Negley) describes in an example, the usage of conventional light fixtures which include a hollow lens that is attached to a base plate for making their lighting device.

U.S. Pat. No. 8,759,855 (Kamada) cites the need for sealing a cavity using a light transmissive hollow lens or cover in constructing a light emitting devise including support member and bonding member.

U.S. Pat. No. 8,628,214 (Negley) describes in an example, the usage of conventional light fixtures which include a hollow lens that is attached to a base plate for making their lighting device.

U.S. Pat. No. 8,596,819 (Negley) describes in an example, the usage of conventional light fixtures which include a hollow lens that is attached to a base plate for making their lighting device.

U.S. Pat. No. 6,634,753 (Rozenman) cites a mirrored hollow lens for the disposable diagnostic contact lens description provided in the background of invention.

U.S. Pat. No. 8,573,804 (Veerasamy, et al.) cites in an example, the usage of conventional light fixtures which include a hollow lens that is attached to a base plate for making their light source, device including light source, and/or methods of making the same.

U.S. Pat. No. 6,643,311 (Krupke) in the claim section, and 5 other places therein, references the phrase—hollow lens— as a component of the diode-pumped alkali laser.

U.S. Pat. No. 8,536,667 (de Graff, et al.) cites the making of a metal mold fabricated from a hollow lens shaped cavity that is filled with a polymer in a semi-liquid form.

U.S. Pat. No. 8,492,788 (Veerasamy, et al.) cites in an example, the usage of conventional light fixtures which include a hollow lens that is attached to a base plate for making insulating glass (IG) or vacuum insulating glass (VIG) unit including light source, and/or methods of making the same.

U.S. Pat. No. 6,936,855 (Harrah) makes many references to hollow lens the compose a bendable high flux LED array.

U.S. Pat. No. 8,441,206 (Myers, et al.) refers to the usage of a hollow lens that is attached to a base as a conventional light fixture for the lighting devises and methods for lighting.

U.S. Pat. No. 7,061,958 (Krupke) makes use of the phrase—hollow lens—as a component of the diode-pumped alkali laser.

U.S. Pat. No. 8,403,531 (Negley) describes in an example, the usage of conventional light fixtures which include a hollow lens that is attached to a base plate for making their lighting device.

U.S. Pat. No. 7,061,960 (Krupke) makes use of the phrase—hollow lens—as a component of a diode-pumped alkali amplifier.

U.S. Pat. No. 8,372,726 (de Graff, et al.) cites the making of a metal mold fabricated from a hollow lens shaped cavity that is filled with a polymer in a semi-liquid form.

U.S. Pat. No. 8,357,553 (Veerasamy, et al.) cites in an example, the usage of conventional light fixtures which include a hollow lens that is attached to a base plate for making a light source with hybrid coating, device including light source with hybrid coating and or methods of making the same.

U.S. Pat. No. 7,140,763 (Keith-Wolfe) makes references to a hollow lens panel(s) and member(s) as a component to a light distribution system.

U.S. Pat. No. 8,337,071 (Negley, et al.) cites in an example, the usage of conventional light fixtures which include a hollow lens that is attached to a base plate for making their lighting device. They also incorporate concave surfaces that are substantially hollow into a lighting device.

U.S. Pat. No. 7,213,940 (Van De Ven, et al.) uses an example of conventional light fixtures which include a hollow lens attached to a base plate for making their lighting device and lighting method.

U.S. Pat. No. 8,335,420 (Beach, et al.) makes references to a hollow lensing duct and a hollow optics element that comprises a lens duct used in the design of their hybrid fiber-rod laser.

U.S. Pat. No. 7,614,759 (Negley, et al.) cites in an example, the usage of conventional light fixtures which include a hollow lens that is attached to a base plate for making their lighting device.

U.S. Pat. No. 8,328,376 (Negley, et al.) cites in an example, the usage of conventional light fixtures which include a hollow lens that is attached to a base plate for making their lighting device.

U.S. Pat. No. 8,310,143 (Van De Ven, et al.) describes an example of conventional light fixtures which include a hollow lens attached to a base plate for making their lighting device and lighting method.

U.S. Pat. No. 7,642,521 (Willi, et al.) cites a formed electrostatic field within in hollow lens body composed of a conduction material will cause an observed physical effect.

U.S. Pat. No. 7,722,220 (Van De Ven) describes an example of conventional light fixtures which include a hollow lens attached to a base plate for making the lighting device.

U.S. Pat. No. 8,276,819 (Canini, et al.) cites the usage of a hollow lens that contains at least one variable curvature liquid for their optical code reader.

U.S. Pat. No. 8,237,912 (Boom, et al.) presents a way to overcome a design limitation by using a hollow lens-liquid boundary for their liquid filled lens element, lithographic apparatus comprising such an element and devise manufacturing method.

U.S. Pat. No. 7,744,243 (Van De Ven) uses an example of conventional light fixtures which include a hollow lens attached to a base plate for making the lighting device.

U.S. Pat. No. 8,174,205 (Myers, et al.) refers to the usage of a hollow lens that is attached to a base as a conventional light fixture for the lighting devises and methods for lighting.

U.S. Pat. No. 7,768,192 (Van De Ven) uses an example of conventional light fixtures which include a hollow lens attached to a base plate for making the lighting device and lighting method.

U.S. Pat. No. 8,120,128 (Matsumoto) cites the usage of a lens accommodating portion that provides a hollow of the lens-barrel base for the optical devise.

U.S. Pat. No. 7,796,173 (Lettvin) refers to a hand held viewer that resembles a magnifying glass with a thick hollow lens having a conical hole bored though one side for an imaging system.

U.S. Pat. No. 7,841,741 (Chan, et al.) cites a light fixture that includes a hollow lens and base plate for a LED lighting assembly and lamp utilizing same.

U.S. Pat. No. 8,112,921 (Van De Ven) uses an example of conventional light fixtures which include a hollow lens attached to a base plate for making the sign and method for lighting.

U.S. Pat. No. 7,898,749 (Ford, et al.) refers to 2 mechanically separate elements on each side of an air gap—(a hollow lens)—that takes some other form when describing multiple reflective lenses and lens types.

U.S. Pat. No. 8,097,926 (de Graff, et al.) cites the making of a metal mold fabricated with a hollow lens shaped cavity that is filled with a polymer in a semi-liquid form for systems methods, and devices having stretchable integrated circuitry for sensing and delivering therapy.

U.S. Pat. No. 7,901,107 (Van De Ven) uses an example of conventional light fixtures which include a hollow lens attached to a base plate for making the lighting device and lighting method.

U.S. Pat. No. 8,079,729 (Van De Ven) describes an example of conventional light fixtures which include a hollow lens attached to a base plate for making the lighting device and lighting method.

U.S. Pat. No. 7,969,549 (Boom, et al.) presents a way to overcome a design limitation by using a hollow lens-liquid boundary for their liquid filled lens element, lithographic apparatus comprising such an element and devise manufacturing method.

U.S. Pat. No. 8,038,317 (Van De Ven) describes an example of conventional light fixtures which include a hollow lens attached to a base plate for making the lighting device and lighting method.

None of these references above disclose a lens that will transform a laser beam into a substantially planar laser sheet.

SUMMARY OF THE INVENTION

In view of the above, the following description relates to a lens shape—or set of shapes—which will enable a laser beam to be transformed into a substantially planar laser sheet after exiting the laser transformer lens.

As an example, a developed laser sheet may be used for projecting an image onto an opaque surface. The resultant projected image lends to a path illumination system which enables precision guidance. The image of the resultant projection is a function of, but not limited to, the electromagnetic wave characteristics and how the transforming lens is configured.

As another example, it is conceivable that a laser sheet may be used for completing the circuit of an electromagnetic sensor. The laser plane may strike a sensor strip—remote from the laser transformer lens—in such a way that it completes the electronic circuit operating the sensor. If the substantially planar sheet is interrupted by objects that pass through or along the substantially planar sheet, the circuit may be broken. The broken circuit would indicate that an object passed through the substantially planar laser sheet.

Another example, related to the electronic communication industry, is the use of planar laser sheets. A particular example may be found in the technology of spatial filtering where transmission screens are used to impress information onto planar optic waves through the means of phase and amplitude modulation as known to those of ordinary skill in the art. The substantially planar laser wave—generated by the laser transformer lens—may be enhance the current technology; such as but not limited to: the ability to carry more information, due to the additional space that a developed planar laser wave is capable of spanning, as it passes through the transmission screen.

As a further example of application, the electronic communication industry has other technologies for the use of planar laser waves in addition to spatial filtering. Another example may be found in technology of holography where a reference optical planar wave is split into two parts. The first part of the split planar optical wave remains a reference wave while the second part is scattered by reflecting off of an object. The reference wave and the scattered wave reflecting from an object interfere with each other to construct the holographic image of the object by those of ordinary skill in the art.

Depending on the lens capability, it is conceivable that a lens transformer may be designed to enhance distance measurements by those of ordinary skill in the art. For example, a concentricity evaluation may be performed with limited or no use of moving parts.

The examples given above reinforce the notion that there is a utilitarian need for lenses that transform laser beams into substantially planar laser sheets by those of ordinary skill in the art.

Generally, the present disclosure relates to a lens in the form of a hollow right circular cylinder which may transform a laser beam into a substantially planar laser sheet—such that the resulting planar sheet approaches a subtended angle of 360 degrees. The geometric parameters which define the cross section of this laser transformer lens may assume many values depending on the service usage requirement. Moreover, the hollow right circular cylinder may be substituted for numerous shapes, but not limited to those shapes detailed below or other shapes known to those of ordinary skill in the art.

BRIEF DESCRIPTION OF THE DRAWINGS

The subject invention, associated features, and usage, may be better understood by referencing drawings shown in FIGS. 1 through 10.

DETAILED DESCRIPTION OF THE DRAWINGS

It is known that a laser beam passing through a translucent prismatic circular cylinder will transform into a substantial laser sheet with certain geometric limitations. Similar transformations will occur by passing a laser beam through a translucent lens shaped as parallelepiped slab. The limitations associated with the cylindrical lens can be identified by the overall projected geometric image that forms with the opaque surface that it projects onto; where the incident angle between the projection surface and the approaching laser sheet is near 90 degrees—or normal.

The shape of the projected image, is a function of—but not limited to—the angle of incidence between the laser beam source and the lens, the distance, from the lens to the projection surface, and the incidence angle between the projection surface and the approaching laser sheet; where the laser transformer lens shape and all other lens characteristics and laser settings are held constant.

Figure 9:
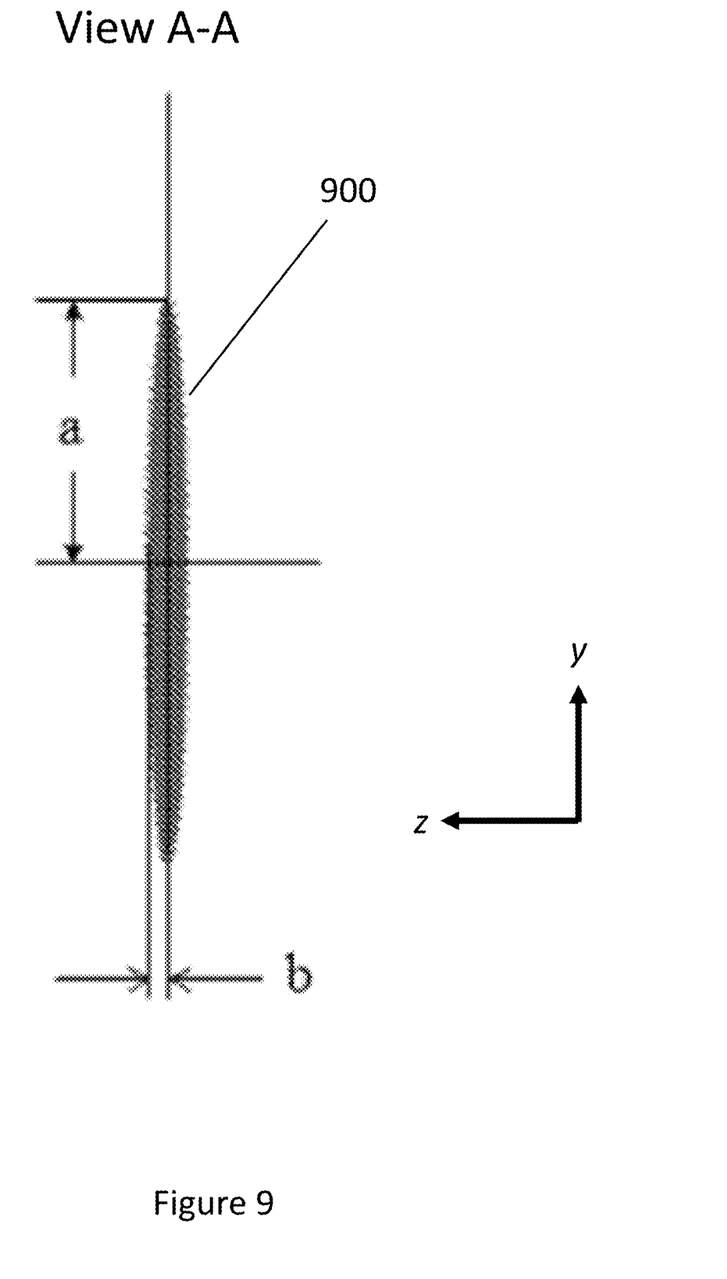
FIG. 9 shows section A-A from FIG. 8 showing a projected laser image.

With reference to FIG. 9, a projected image 900 developed by a laser sheet emitted from a translucent prismatic cylinder has the form of a slender ellipse. The largest and smallest measureable lengths from the projected ellipse center to the image boundary have the limiting values, a and b.

Figure 8:
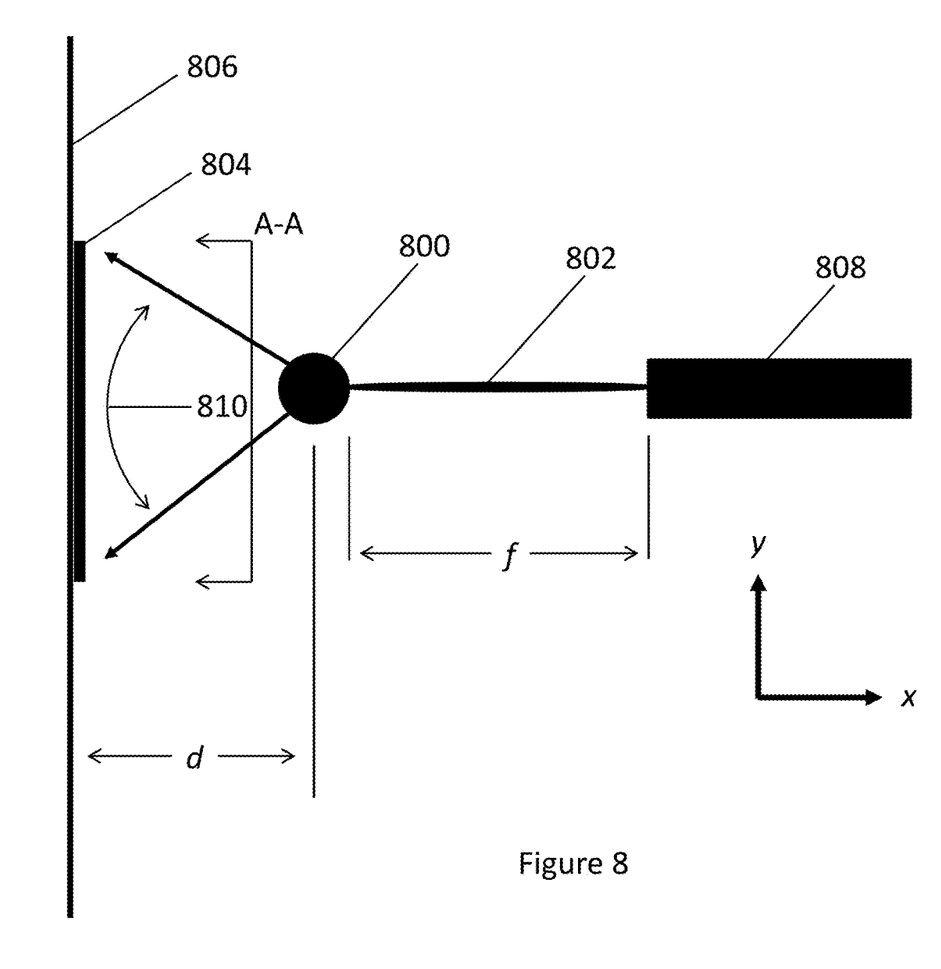
FIG. 8 is an elevation sketch of a laser testing the projected image due to passing a laser beam through a solid circular lens section.

With reference to FIG. 8, by experimenting with a solid cylinder lens 800, it was found that the lengths a and b are functions of the angle of incidence of the laser beam 802, and the distance d from the lens 800 to the projected image 804 (based on subtended angle of the laser plane 810) on a surface 806. The laser beam travel length (from the exit of the laser source 808 to impingement on the lens 800). f had a mild influence on the lengths a and b. When varying the distances f and d to get significant changes in the lengths a and b, the distances f and d had to assume values on the order of the lengths a and b. Also, by varying the laser beam incidence angle off of the normal direction to the lens, the variables a and b changed while the projected ellipse became highly distorted.

Figure 10:
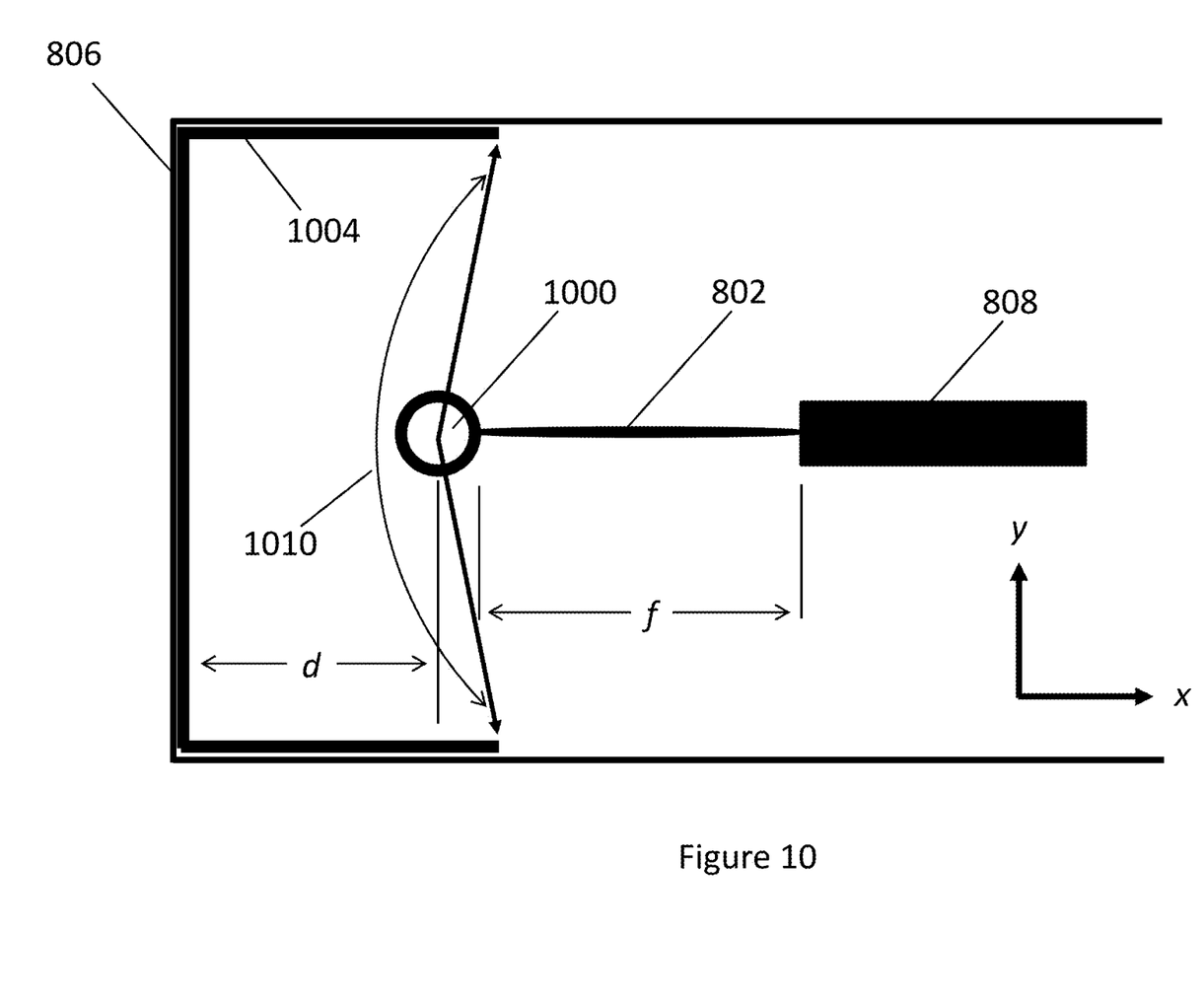
FIG. 10 is an elevation sketch of a laser testing the projected image due to passing a laser beam through a hollow circular lens section.

Due to the spatial limitations that occur when attempting to control the projected image size using the solid cylindrical lens 800, the need for finding another lens shape was clear. With reference to FIG. 10, by experiment, it was found that a lens 1000 having the section shape of a hollow cylinder with substantially uniform solid portion thickness generated a substantially planar laser sheet 1004 (based on angle of the laser plane 1010) which spans a space significantly greater than the space spanned by that generated from the solid section cylinder lens 800. That is to say, the distance a, along the major axis of the elliptic projection 804, created by the solid cylindrical lens 800 was increased substantially for the expanded projected image 1004 while the distances f and d remained significantly less than the distance a.

Using the laser transformer lens having a hollow section shape therein, spatial benefits were observed with the developed laser sheet and the image that it cast onto the projection surface without the need to substantially increase the distances f and d. The expanded laser sheet was capable of spanning a space significantly larger than that of the former laser sheet projected from the solid cylinder lens. The expanded projected image approached that of a substantially straight and narrow line (due to the relative increase in the ratio of the distances a and b) provided that the normal incidence angles, between the approaching laser sheet and projection surfaces, remained normal.

The results found from the basic experiment referred to above imply that the lens characteristics such as: geometry, orientation, relative position, and others known to those of ordinary skill in the art, controls at least the development of the laser sheet and the projected image. As such the present disclosure further describes laser transformer lenses having one or more hollow portions therein.

Examples incorporating one or more aspects of the present invention are described and illustrated in the following figures. These illustrated examples are not intended to be limiting. For example, one or more aspects of the present invention may be utilized in other embodiments and even other types of devices that would enhance the laser wave form with desired characteristics not present without the usage of the laser transformer lens technology.

Examples of the present invention may be applicable to a variety of illuminating—or optical—devices and systems with varied alignment light sources, colors, and beam patterns known to those of ordinary skill in the art. Examples of the application of the present invention may also be part of a larger application known to those of ordinary skill in the art.

Figure 1:
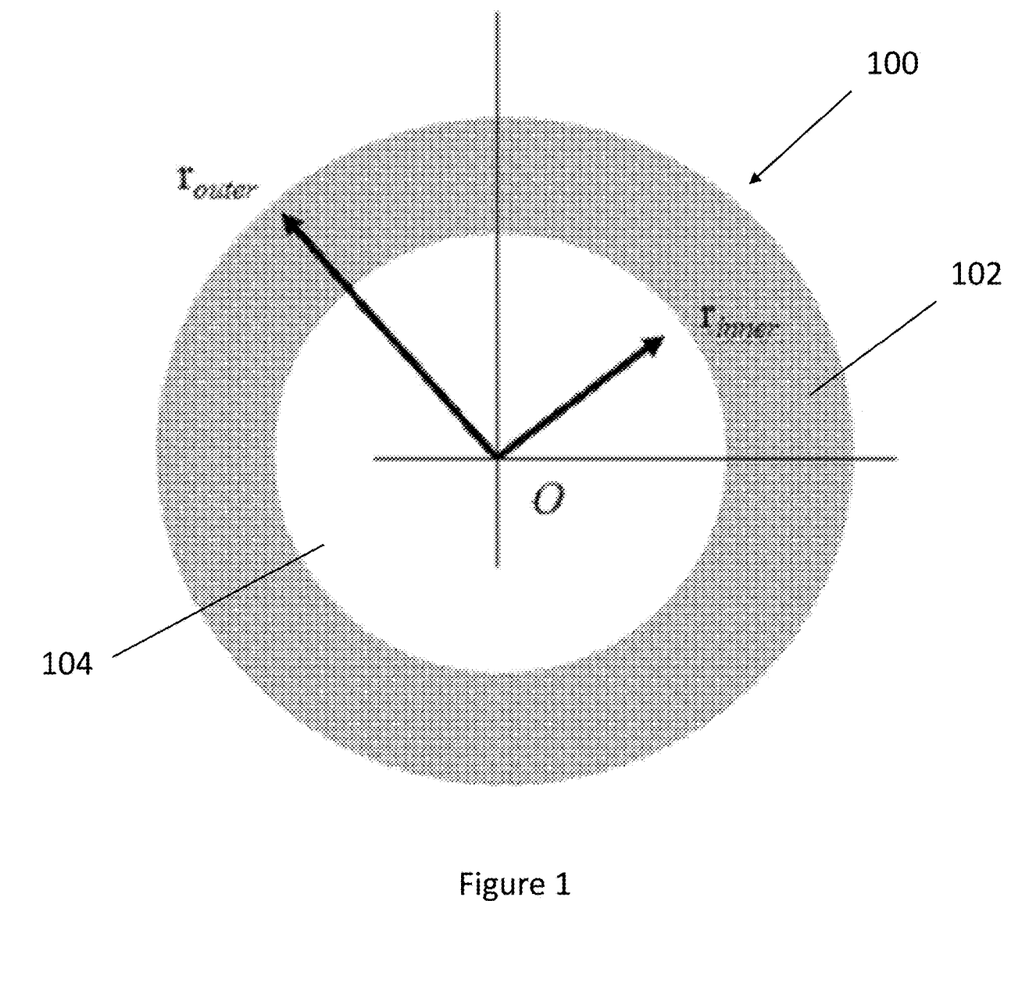
FIG. 1 shows a lens with a section view of a hollow circular tube having uniform solid portion thickness.

FIG. 1 shows a cross-section view of a hollow translucent right circular cylinder transformer lens 100. The lens 100 has a uniformly thick solid portion 102 having an exterior wall/boundary that forms a circular exterior shape of the lens 100, and having an interior wall/boundary defining a hollow portion 104. Two perpendicular axis along the horizontal and vertical directions are shown that have an origin O at the center of the hollow portion 104 and the lens 100 cross-section, which are shared by virtue of the uniform thickness of the solid portion 102 of the lens 100. The shape of this section is known to be multiply connected to those of ordinary skill in the art. Such multiply connected sections are conventionally understood as having closed paths which cannot be continuously contracted to a point within the section. For situations where the length of the lens along an axis normal to the axes shown—with a length multiple times larger than the outer radius—it was found that the laser sheet spans a space that is substantially parallel to the plane spanned by axes shown. By impinging a laser beam onto the exterior surface of the laser transformer lens shown in FIG. 1—such that the incidence angle is normal to the lens exterior—a laser sheet is developed which spans a substantially planar space with an angle approaching 360°, and in particular as shown in FIG. 10, at least greater than 180°.

Figure 2:
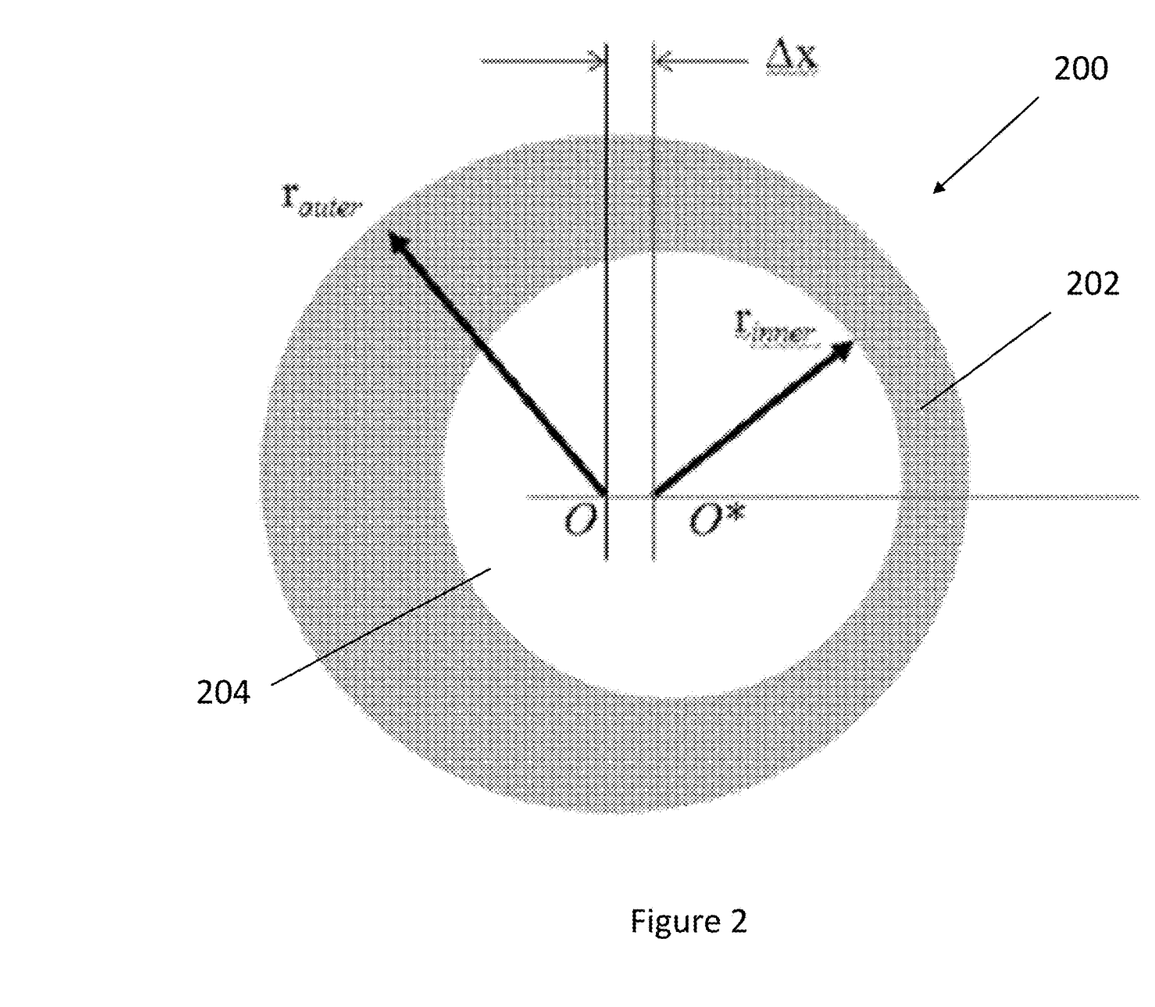
FIG. 2 shows a lens with a section view of a hollow circular tube having variable solid portion thickness.

FIG. 2 illustrates another example laser transformer lens 200 having a multiply connected shape with hollow portion 204. Similar to FIG. 1, the cylindrical section (having a cylindrically shaped solid portion 202) has a circular boundary wall on the interior having radius $r_{inner}$ (defining hollow portion 204) with an origin O* (of the hollow portion 204) offset to the right of origin O (of the whole lens 200 cross-section) a distance $\Delta x$ from the center of the exterior boundary. Depending on the service requirement $\Delta x$ may assume any number of values that may or may not maintain a multiply connected section; hence, forming a simply connected section bounded by one curve. Contrasted with the above-described multiply connected sections, a simply connected section is conventionally understood as being a path-connected domain where one can continuously contract any simple closed curve into a point while remaining in the domain. For two-dimensional regions, a simply connected domain is understood as one without holes in it.

Figure 3:
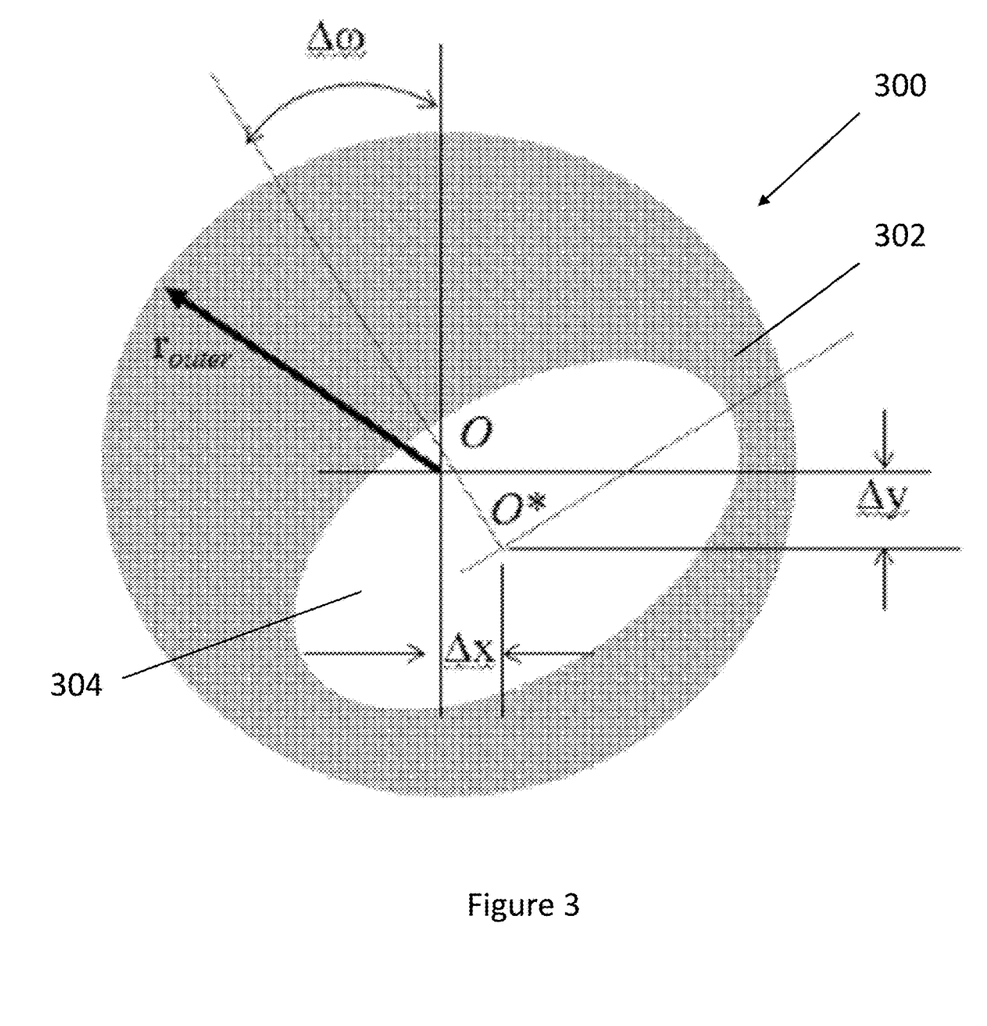
FIG. 3 shows a lens with a section view of a hollow circular tube with an elliptical internal boundary having variable solid portion thickness.

The example of the multiply connected lens 300 cross-section shown in FIG. 3 is similar to FIG. 2; however, the circular section having an outer radius $r_{outer}$ has an elliptical interior hollow portion 304 defined by the interior wall of solid portion 302 and centered at origin O* (of the hollow portion 304) with offset distances $\Delta x$ and $\Delta y$ from origin O (of the lens 300 cross-section). It is conceivable that the interior boundary may be rotated about an axis perpendicular to the section by an arbitrary angle $\Delta \omega$. Depending on the service requirement; $\Delta x$, $\Delta y$, and rotation angle $\Delta \omega$, may assume a number of values that maintain a multiply connected section. The distances $\Delta x$, $\Delta y$, and rotation angle $\Delta \omega$, may even assume values which turn the section from multiply connected to that of being simply connected.

Figure 4:
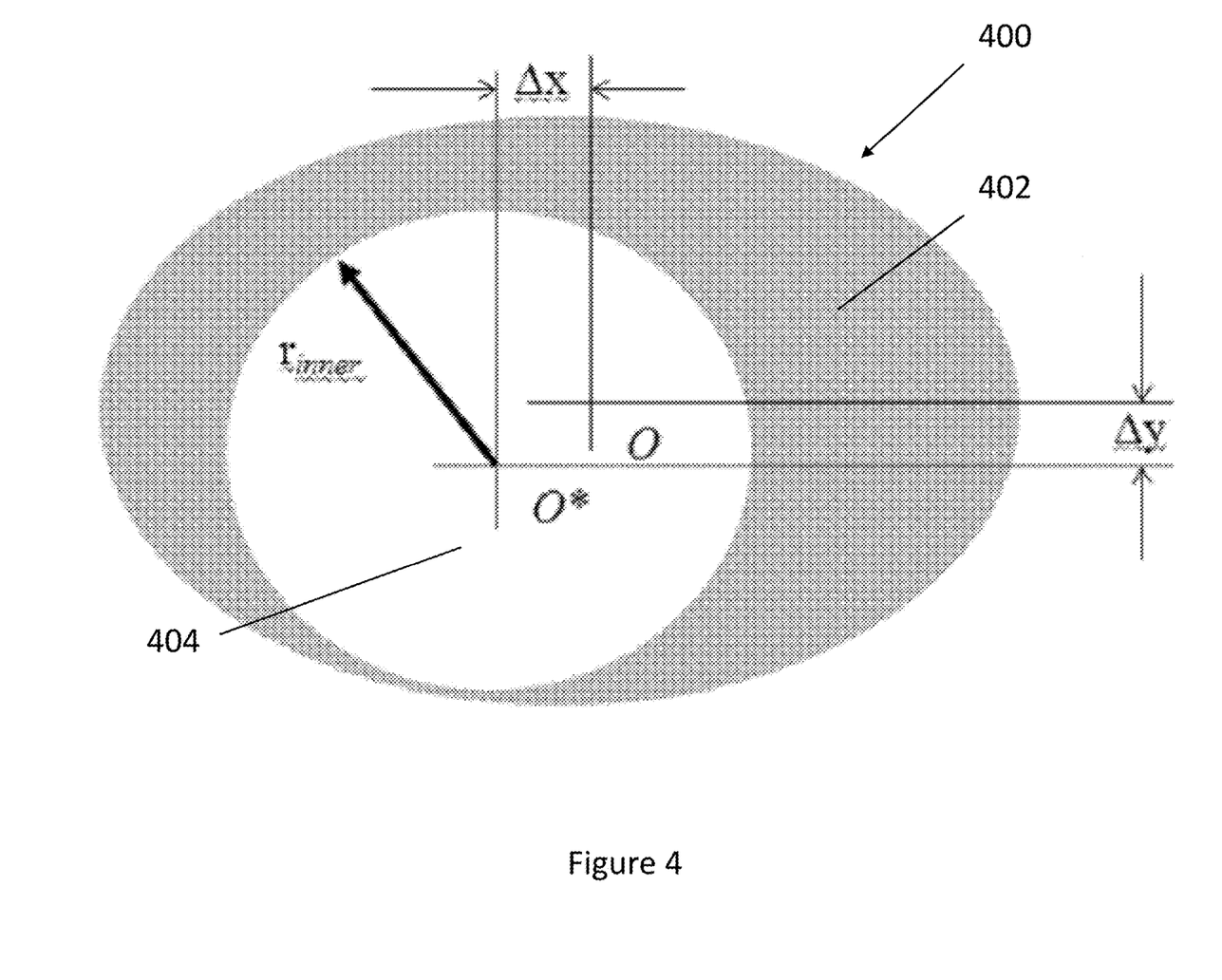
FIG. 4 shows a lens with a section view of an elliptical tube with a circular internal boundary with variable solid portion thickness.

Another multiply connected lens 400 cross-section shown in FIG. 4 to some extent is the inverse of the multiply connected lens 300 cross-section shown in FIG. 3. The exterior boundary of solid portion 402 has the shape of an ellipse whereas the interior boundary defining hollow portion 404 has a circular shape. The interior boundary is centered at origin O* (of the hollow portion 404) and is offset from the center O of the exterior boundary by distances $\Delta x$ and $\Delta y$. The distances $\Delta x$ and $\Delta y$ may even assume values which turn the section from multiply connected to that of being simply connected.

Figure 5:
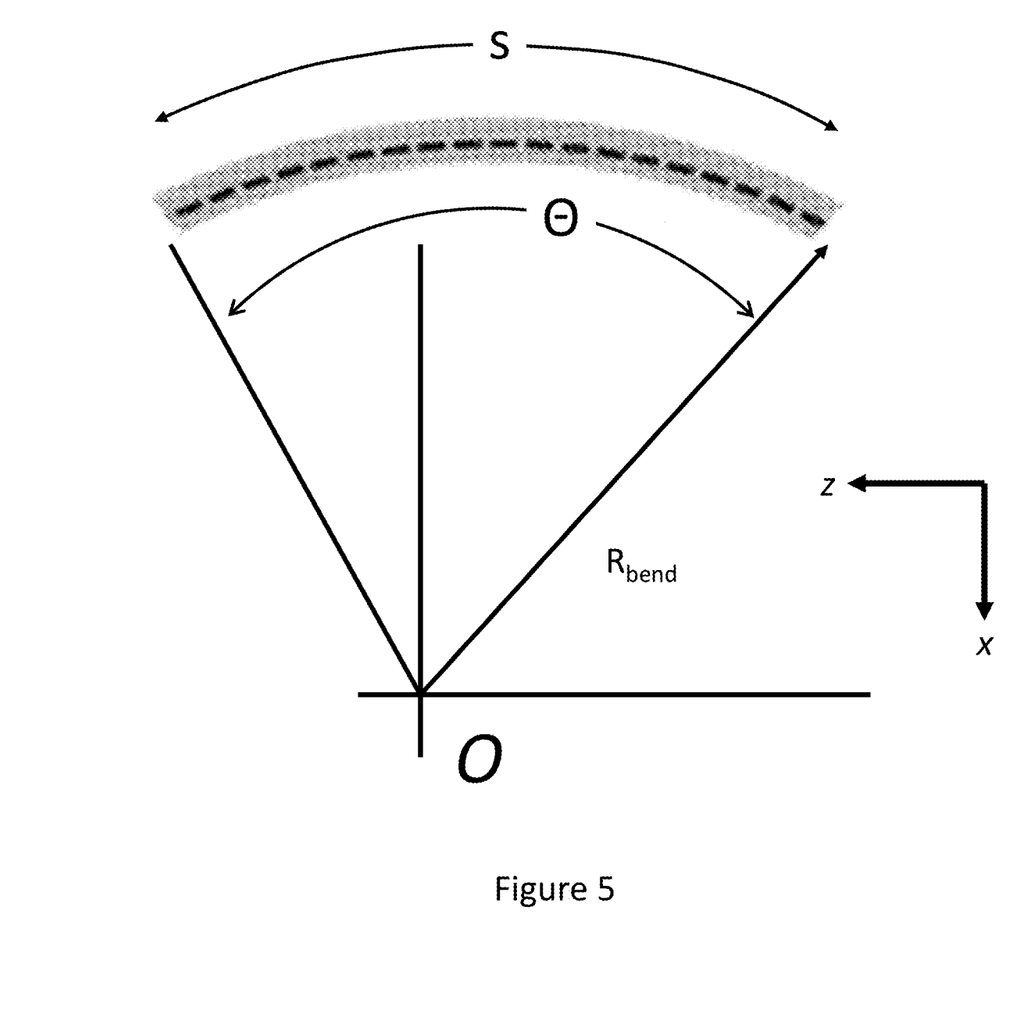
FIG. 5 shows a plan view perspective of a shaped transform.

FIG. 5 is an overhead view of a lens. The radial distance from the center point O to the centroidal axis of the section, shown as a dotted line, is labeled $R_{bend}$. The lens embodiment subtends the radian measure $\theta = s/R_{bend}$. The laser transformer lens of the present disclosure may or may not have values of curvature $1/R_{bend}$ that tend to zero. In fact, for the generalized case, both the section shape and curvature may be a function of the laser transformer lens length, s. Moreover, a radial distance R may locate any reference point in the section; where the section shape and curvature may be a function of the laser transformer lens length, s.

The laser transformer lens may be extruded from sections described in the above examples. Other examples of exterior and interior bounding curves—that may define sections that transform a laser beam into a planar sheet—may be those of conic sections like parabolas and hyperbolas, along with arbitrary shapes known to those of ordinary skill in the art. These curves may be interchanged from the exterior of the laser transformer lens to interior regions of the laser transformer lens—similar to what was done with the sections having circular and elliptic shapes shown in FIG. 3 and FIG. 4; where general usage of the notation $\Delta x$, $\Delta y$, and $\Delta \omega$ are applicable. These sections may describe simply or multiply connected regions. Interchanging the bounding curves may be done so to enhance the shape and optical characteristics of the developed laser sheet depending on the service usage requirement.

To a larger extent, the laser transform section may be extruded such that it may be simply connected over the majority of the lens volume, with one or more cavity(s) (extruded hollow portions) positioned substantially away from the ends or anywhere in between. In the region where a cavity resides, it may or may not be completely embedded into the surrounding material. Cavity shapes may assume those of conic sections and truncations thereof; and also, arbitrary shapes known to those of ordinary skill in the art. The bounding surfaces—used to define a cavity boundary—may or may not vary with the arc length s and they are meant to be completely generalized. These geometric configurations, and others known to those skilled in the art, may enhance the developed laser sheet that is transmitted through the lens.

The exterior and interior lens boundaries may be faceted, truncated, or shaped locally or otherwise in ways that are known to those of ordinary skill in the art.

Figure 6:
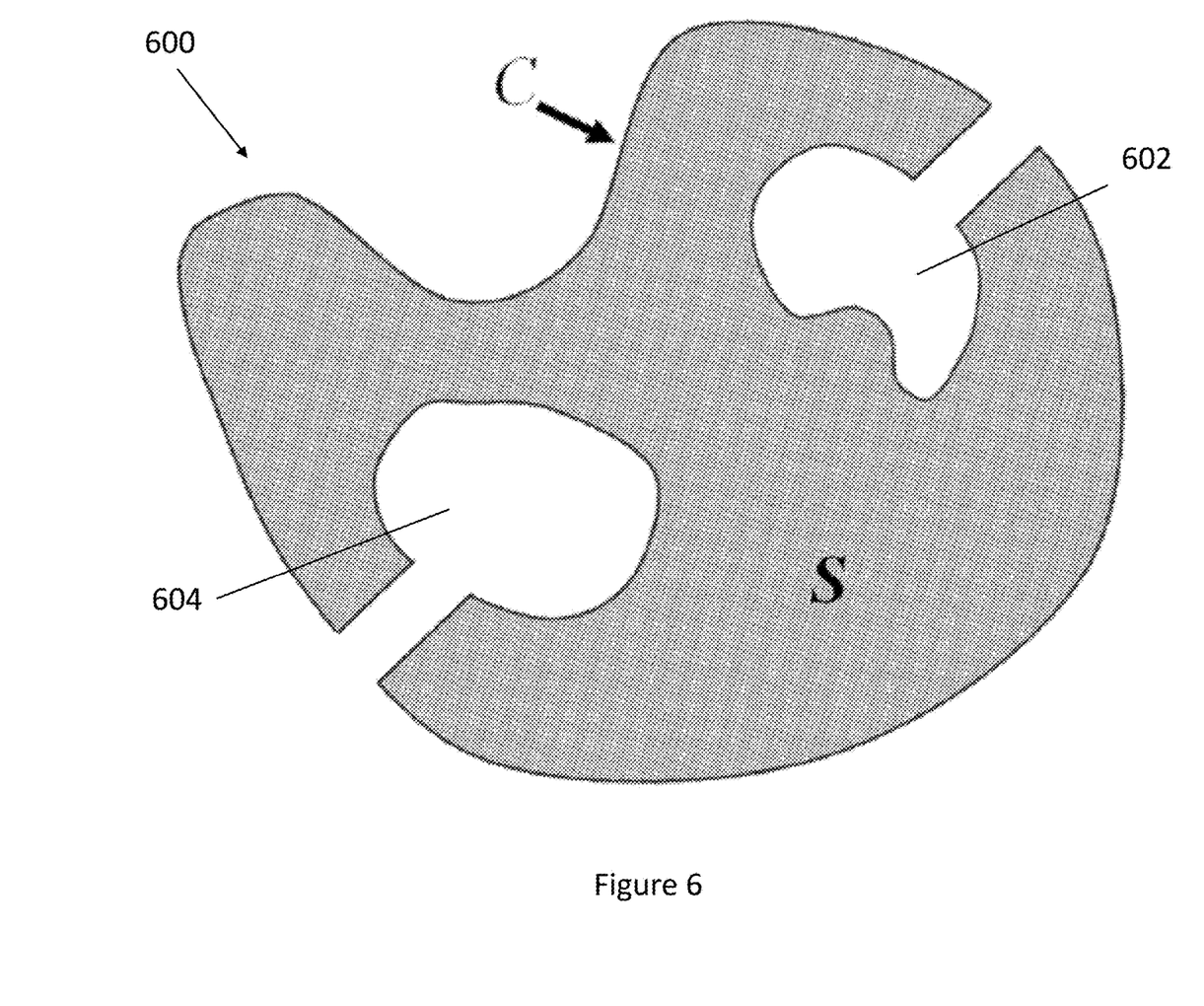
FIG. 6 is an arbitrary shape of a lens section S that is simply connected.

FIG. 6 is a view of an arbitrary laser transformer lens 600 cross-section having a solid portion S bounded on the exterior by a curve C, and cavities 602 and 604. Since one curve completely describes the section 600 and solid portion 5, section 600 and solid portion S is said to be simply connected.

Figure 7:
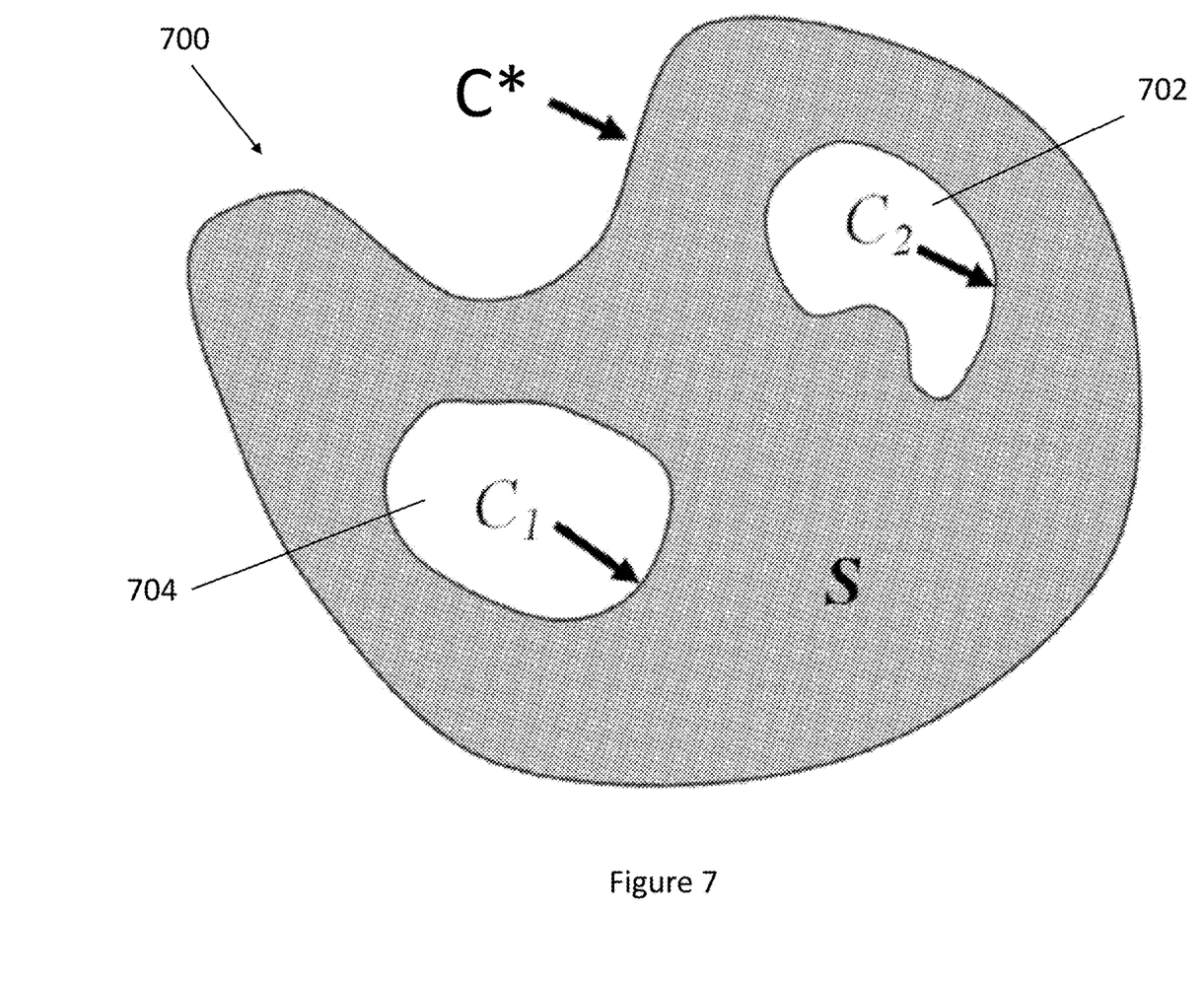
FIG. 7 is an arbitrary shape of a lens section S that is multiply connected.

FIG. 7 is a view of an arbitrary lens section 700 having a solid portion S bounded on the exterior by curve C* while having interior boundaries defining cavities 702 and 704 that are defined by curves $C_1$ and $C_2$. Since interior boundaries defined by curves $C_1$ and $C_2$ exist separately within solid portion S, the lens section and solid portion is said to be multiply connected. It is conceivable that any multiply connected sections may have numerous interior curves that define boundaries to distinct regions on the interior of curve C*—for the purpose of developing a laser sheet that is transmitted through the laser transform lens section.

From the principals of electro-magnetic (EM) wave propagation, material properties such as permittivity $\epsilon$, permeability $\mu$, dielectric constant $\epsilon_r$, intrinsic impedance and others known to those of ordinary skill in the art, control the reflection, and transmission of the EM wave at boundaries where material properties change. The wave speed of the EM wave is also dependent on both $\epsilon$ and $\mu$.

Shaped interface boundaries effect the angle of incidence between the laser light and the interface surface which it impinges on. For curves C, $C_1$, and $C_2$ shown in lens section 600, the angle of incidence changes continuously for a given direction of an EM wave source. This implies that the angle of incidence is predominantly oblique in most configurations and that the occurrences of normal incident angles are rare. Phase velocity may be controlled with configurations which have oblique incidence. For instances where the laser beam is polarized the components of the EM wave have varying impedance characteristics as they impinge on the interface that may be used to enhance the reflected and transmitted waves.

Laser transformer lens sections—such as those generalized shapes shown in FIG. 6 and FIG. 7—may be designed by shaping boundaries and aligning material changes across the section such that the reflected and transmitted laser light wave may be designed to accommodate numerous applications known to those of ordinary skill in the art.

FIG. 7 implies that the curve C* may assume any shape while the distance between the interior curves of any shape $C_1$ and $C_2$ could approach each other—to any tolerance—in an engineered fashion that results in controlled wave reflection and transmission. On the other hand, FIG. 7 implies that the curve C* may assume any shape while the distance between the interior curves $C_1$ and $C_2$ could diverge from each other—to any tolerance—in an engineered fashion that results in controlled wave reflection and transmission. These geometric configurations, and others known to those skilled in the art, may be used to enhance the developed laser sheet that is transmitted through the lens. NOTE: Curves $C_1$ and $C_2$ are completely arbitrary to the extent that either one may not be defined. Additionally the curves $C_1$ and $C_2$ may be formed by faceting of the surfaces as opposed to the formation of true curves. The geometry of the facets may be uniform to each other or individually unique as a requirement of the transmitted wave shape or transmitted wave amplitude distribution to be created.

Moreover, recall that lens sections bounded by a curve C* may be configured with numerous interior curves. More examples of how these interior curves could be configured into the lens section are given below. The first example is that these numerous interior curves could approach the exterior boundary. The second example is that these numerous interior curves could diverge from the exterior boundary. As a third example, in some instances these numerous interior curves could approach each other and the exterior boundaries. A fourth example may be that numerous interior curves could diverge from each other while diverging from the exterior boundary. In essence, the interior curves could assume any position within the curve C*.

Coatings—thin, thick or other—may or may not be applied to the boundaries represented by curves C, $C_1$, and $C_2$ of any arbitrarily shaped lens shown in section. These coatings may control the reflection from the EM waves by impedance matching techniques known to those skilled in the art. One example may be that the coating has a uniform thickness when applied to the boundaries represented by curves C, $C_1$, and $C_2$. A second example may be that the uniform thickness coating be applied in uniform layers. Yet a third example may be that the thin coatings may be applied with varying thickness to the boundaries represented by curves C, $C_1$, and $C_2$. As a fourth example a hybrid lens may be fashioned such that the coatings are applied in such a way that a combination of 1 or more uniform thickness layer and one or more varying thickness layer are used over the surface of the boundaries represented by curves C, $C_1$, and $C_2$. All possible layering coating concepts may be used to enhance the developed laser sheet that is transmitted through the lens. For example the layered coatings may be selectively deposited in some areas of the lens and not others. The formation of grids or radiating apertures of uniform or non-uniform size or shape deposited or otherwise created on curves C, $C_1$, and $C_2$ may be applied. These selectively deposited coatings may require the preparation of the hosting surface to be prepared in a manner such as microchemical etching, selective laser ablation, mechanical ablative/mechanical surface conditioning techniques or other such techniques generally known to those of ordinary skill in the art. These surface conditioning techniques may also be used alone as a method of altering the optical characteristics of the surfaces to change or enhance the formation of the shaped laser sheet. These enhancements include but are not limited to a tailoring of the amplitude of the light output and or changing the thickness or width of the laser sheets beam at selected positions across the span of the laser sheet.

Hybrid lenses may be designed such that multiple material discontinuities reside in the section of a lens. For example, lens section 600 shown in FIG. 7 may be called the base material M. The region bound by interior curve $C_1$ may be filled with another translucent material $M_1$ different than material M. Similarly, the region bounded by interior curve $C_2$ may be filled with yet another translucent material $M_2$ which may or may not be different from material $M_1$. This hybrid approach to lens design may be used for the purpose of developing numerous material interfaces in a multiply connected section where numerous regions exist to enhance the developed laser sheet that is transmitted through the lens. NOTE: The material represented by labels $M_1$ and $M_2$ may be solid, fluid, gaseous, vapor, plasma or colloids.

Materials used for the present invention may be dielectrics that are categorized as isotropic, anisotropic, as well as nonlinear and known to those of ordinary skill in the art. They may be used in order to enhance the reflected and transmitted wave forms that are transmitted through the lens.

The invention claimed is:

1. A device configured to transform an impinging laser beam into a laser sheet, the device comprising:
   a lens having a solid portion and a cavity, a shape of the lens being defined by an exterior wall and a shape of the cavity being defined by an interior wall, and the solid portion being bounded by the interior wall and the exterior wall,
   wherein the lens is configured to transform the impinging laser beam into the laser sheet at a subtended angle of at least greater than 180 degrees wherein a distance between a source of the impinging light and the lens, and a distance between the lens and a surface on which the laser sheet is projected, are each less a distance between a center of the projected laser sheet and an edge of the projected laser sheet.

2. The device of claim 1, wherein in a cross-section of the lens through the cavity, the exterior wall is defined by a first conic shape and the interior wall is defined the first conic shape of a smaller proportion.

3. The device of claim 2, wherein a center of the first conic shape defining the exterior wall is at the same location as a center of the smaller first conic shape defining the interior wall.

4. The device of claim 2, wherein a center of the first conic shape defining the exterior wall is offset from a center of the smaller first conic shape defining the interior wall.

5. The device of claim 2, wherein the first conic shape is a circle.

6. The device of claim 2, wherein the first conic shape is an ellipse.

7. The device of claim 1, wherein in a cross-section of the lens through the cavity, the exterior wall is defined by a first conic shape and the interior wall is defined by a second conic shape, the first conic shape being different from a not proportional to the first conic shape.

8. The device of claim 7, wherein a center of the first conic shape defining the exterior wall is at the same location as a center of the second conic shape defining the interior wall.

9. The device of claim 7, wherein a center of the first conic shape defining the exterior wall is offset from a center of the second conic shape defining the interior wall.

10. The device of claim 7, wherein the first conic shape or the second conic shape is a circle.

11. The device of claim 7, wherein the first conic shape or the second conic shape is an ellipse.

12. The device of claim 1, wherein the solid portion has a uniform thickness.

13. The device of claim 1, wherein:
   the lens has at least two cavities, and
   in a cross-section of the lens through the at least two cavities, the exterior wall and the interior wall are defined by a single arbitrary curve.

14. The device of claim 1, wherein:
   the lens has at least two cavities, and
   in a cross-section of the lens through the at least two cavities, the exterior wall and interior walls defining each of the at least two cavities are each defined by separate arbitrary curves.

15. The device of claim 1, further comprising a coating applied to the exterior wall and/or the interior wall.

16. The device of claim 1, wherein the cavity is hollow.

17. The device of claim 1, wherein the cavity is filled with a material that is different from a material of the solid portion.

18. The device of claim 17, wherein the material in the cavity or a material of the solid portion is a dielectric.

19. The device of claim 1, wherein the shape of the cavity is simply connected as defined by a plurality of curves.

20. The device of claim 1, wherein the shape of the cavity is multiply connected as defined by a plurality of curves.

21. The device of claim 1, further comprising two cavities, wherein the shape of a first of the two cavities is simply connected as defined by a first plurality of curves and the shape of a second of the cavities is multiply connected as defined by a second plurality of curves.

22. The device of claim 1, wherein at least a portion of the interior wall defining the shape of the cavity is a straight.

23. The device of claim 1, wherein at least a portion of the interior wall defining the shape of the cavity is a curved.

* * * * *

UNITED STATES PATENT AND TRADEMARK OFFICE
CERTIFICATE OF CORRECTION

PATENT NO. : 10,422,998 B1
APPLICATION NO. : 14/869931
DATED : September 24, 2019
INVENTOR(S) : Mark Belloni

Page 1 of 1

It is certified that error appears in the above-identified patent and that said Letters Patent is hereby corrected as shown below:

In the Specification

Column 9, Line 50, delete "5" and insert --S--

Signed and Sealed this
Twenty-fourth Day of December, 2019

Andrei Iancu
*Director of the United States Patent and Trademark Office*